United States Patent
Asplund (10) Patent No.: US 9,199,541 B2
(45) Date of Patent: Dec. 1, 2015

(54) SYSTEM ADAPTED FOR ONE OR MORE ELECTRICALLY PROPELLABLE VEHICLES (ARM-SHAPED CONTACT MEANS)

(75) Inventor: Gunnar Asplund, Solna (SE)

(73) Assignee: Elways AB, Solna (SE)

( * ) Notice: Subject to any disclaimer, the term of this patent is extended or adjusted under 35 U.S.C. 154(b) by 149 days.

(21) Appl. No.: 13/638,644

(22) PCT Filed: Mar. 31, 2011

(86) PCT No.: PCT/SE2011/050377
§ 371 (c)(1),
(2), (4) Date: Oct. 1, 2012

(87) PCT Pub. No.: WO2011/123046
PCT Pub. Date: Oct. 6, 2011

(65) Prior Publication Data
US 2013/0020162 A1      Jan. 24, 2013

(30) Foreign Application Priority Data

Apr. 1, 2010   (SE) ...................... 1000323

(51) Int. Cl.
*B60L 5/40*   (2006.01)
*B60M 1/34*   (2006.01)
(Continued)

(52) U.S. Cl.
CPC ... *B60L 5/40* (2013.01); *B60L 5/42* (2013.01); *B60M 1/34* (2013.01); *B60M 1/36* (2013.01); *B60M 7/003* (2013.01); *B60L 2200/26* (2013.01)

(58) Field of Classification Search
CPC .............. B60L 5/28; B60L 5/38; B60L 5/39; B60L 5/40; B60L 5/36; B60L 5/42; B60M 1/34; B60M 1/30; B60M 1/36
USPC ......................... 191/45 R, 48, 49, 22 C, 23 R
See application file for complete search history.

(56) References Cited

U.S. PATENT DOCUMENTS

| 141,604 A * | 8/1873 | Smith ............................... 246/9 |
| 3,195,472 A * | 7/1965 | Rannalli ......................... 104/60 |

(Continued)

FOREIGN PATENT DOCUMENTS

| EP | 0505845 A1 | 9/1992 |
| WO | 9310995 A1 | 6/1993 |
| WO | 2007056804 A1 | 5/2007 |

OTHER PUBLICATIONS

Written Opinion of the International Searching Authority issued on Jun. 21, 2011 by the SE International Searching Authority in International Application No. PCT/SE2011/050377.

(Continued)

*Primary Examiner* — Zachary Kuhfuss
(74) *Attorney, Agent, or Firm* — Raymond R. Ferrera; Adams and Reese LLP (57) ABSTRACT

Contact means (4) related to a vehicle are adapted to comprise an elongated arm (50), one end portion (50a) of which is rotatably attached to the underside (bottom) of the vehicle (1) and the other end portion (50b) of which is adapted to support said contact means (4). One or more sensors (151a, 151b) are disposed at the vehicle (1) and are intended to be able to sense the presence of and the orientation of a track or groove (51) and transfer sensed information to a power control circuit (100), which is adapted to comprise a control circuit (100b), which when sensing the existence of and a sensed orientation of a track or groove (51), within a covered and restricted area, is to be adapted to actuate means (7) adapted to a sidewise movement and/or a lowering (or raising) movement at the contact means (4).

9 Claims, 4 Drawing Sheets (51) Int. Cl.
*B60L 5/42* (2006.01)
*B60M 1/36* (2006.01)
*B60M 7/00* (2006.01)

(56) References Cited

U.S. PATENT DOCUMENTS

| | | | |
|---|---|---|---|
| 4,129,203 A | | 12/1978 | Berman |
| 4,238,010 A | * | 12/1980 | Hidaka ............................ 191/31 |
| 4,239,094 A | * | 12/1980 | Uchiyama et al. .............. 191/25 |
| 5,277,285 A | * | 1/1994 | Musachio ........................ 191/6 |
| 5,673,774 A | * | 10/1997 | Trapp et al. ..................... 191/49 |
| 6,152,273 A | * | 11/2000 | Kilkenny ........................ 191/58 |
| 6,216,835 B1 | * | 4/2001 | Livesay et al. .............. 191/45 R |
| 7,188,716 B2 | * | 3/2007 | Lamschick ..................... 191/49 |
| 2005/0236244 A1 | * | 10/2005 | Lamschick ..................... 191/66 |
| 2012/0067684 A1 | * | 3/2012 | Asplund ..................... 191/22 C |
| 2013/0020163 A1 | * | 1/2013 | Asplund ..................... 191/22 C |
| 2013/0020164 A1 | * | 1/2013 | Asplund ..................... 191/29 R |
| 2013/0020165 A1 | * | 1/2013 | Asplund ..................... 191/29 R |
| 2013/0020866 A1 | * | 1/2013 | Asplund ........................ 307/9.1 |
| 2013/0025168 A1 | * | 1/2013 | Asplund ........................ 37/207 |
| 2013/0025989 A1 | * | 1/2013 | Asplund ........................ 191/49 |
| 2013/0025990 A1 | * | 1/2013 | Asplund ..................... 191/22 C |
| 2013/0025991 A1 | * | 1/2013 | Asplund ..................... 191/22 C |
| 2013/0025992 A1 | * | 1/2013 | Asplund ..................... 191/22 C |

OTHER PUBLICATIONS

International Search Report issued on Jun. 30, 2011 by the SE International Searching Authority in International Application No. PCT/SE2011/050377.

* cited by examiner

SYSTEM ADAPTED FOR ONE OR MORE ELECTRICALLY PROPELLABLE VEHICLES (ARM-SHAPED CONTACT MEANS)

TECHNICAL FIELD OF THE INVENTION

This invention refers generally to an arrangement related to vehicles, specifically to such an arm-shaped arrangement which is adapted to be able to horizontally move and/or vertically elevate and lower a contact means and/or a contact device, with each vehicle being adapted to a system appropriate for electrically propellable vehicles and more particularly to such system in which i.a. one or more batteries and/or a set of batteries for power adaptation and energy storage are intended for being able to propel the vehicle rolling along a stretch of a roadway.

Systems of this type are based on utilizing a specifically designed stretch of the road or roadway wherein the upper surface of this stretch of the roadway exhibits at least one track, in the form of groove, and in which track one, two or more parallel electric conductors or strips with a conductor surface may be placed under power or voltage are disposed and which preferably are provided with uncovered and uninsulated contact surface sections.

In accordance with the instructions of the present invention such system is to comprise; a plurality of roadway sections or portions subdividing the total stretch of the roadway and each allotted to one or more electrically conductive surfaces, such as conductors or strips, said roadway portions being connectable, over a switch, to one or more stationary electric stations serving as a source of power or energy, external to vehicles so as thereof i.a. to charge batteries belonging to vehicles and/or sets of batteries intended primarily to propel the vehicle by means of said set of batteries along the stretch of the roadway and its roadway sections or portion and one or more, over an individual electric motor or a plurality of motors, propellable vehicles, wherein each of said vehicles is to exhibit a control circuit, controlling the power so as to create a chosen and required propelling effect and/or a speed adaptation and/or control.

The invention is to be applied to stretches of roadways in the form of public and private roads and along their road sections or portions but can also find use in industrial systems having different requirements of power and energy.

The invention has the purpose i.a. of concurrently with power charging of the set of batteries from the external source of energy supplying the power and the energy which will be required for a chosen power requirement for driving the vehicle upwards and over an upwardly rising portion of the roadway.

More particularly the present invention refers to such system in which a non-railbound vehicle, such as a freight vehicle, while being driven along chosen roadway sections or portions with its set of batteries allotted to the vehicle, can be supplied with supplementary power and energy, such as from the external source of power or alternatively from a source of power related to the vehicle, such as a diesel generator.

In this regard the present invention proposes a first source of power related to the vehicle, such as a diesel generator, a second source of power related to the vehicle, such as a battery set, and a third source of power separated from the vehicle and being disposed externally, such as two or more conductor surfaces, such as conductors or strips which may be placed under power and be included in tracks or grooves in successive roadway sections or portions with the conductors of a chosen roadway section being electrically insulated from corresponding conductors in an adjacent (preceding or succeeding) roadway section or portion.

The present invention is based on having two or more conductors built into one track or into individual tracks or grooves in their respective roadway sections or portions, with said track (not the conductors) extending continually from roadway section or portion to roadway section or portion.

The voltage which is allotted to these conductors can be an alternating voltage (AC-power) (with a vehicle-related rectifier) or a direct voltage (DC-power). In choosing a DC-power one of the conductors can be positive, whereas the other conductor, can be negative and an additional conductor can be allotted ground potential or zero potential, with the vehicle being operated at twice the value of the voltage.

With alternating voltage to the conductor of the roadway sections said voltage can to advantage be disposed in anti-phase and symmetrically around a ground potential or zero potential.

The motor intended for driving the vehicle can be of the DC-power type or of the AC-power type, with a converter being connected prior to the motor in the latter case.

BACKGROUND OF THE INVENTION

Methods, arrangements, and structures related to the technical field and character mentioned above are known earlier in a number of different embodiments.

With regard to electrically propellable vehicles, the latter can to advantage be categorized as "railbound vehicles" or as "non-railbound vehicles".

"Railbound vehicles" are driven along their stretch of the roadway and roadway sections on parallel rails disposed in their stretch of the roadway or on parallel rails laid open by sleepers or the like and guiding the fixed pairs of wheels of the vehicle.

"Non-railbound vehicles" are conveyed along their stretch of the roadway and roadway sections or portions over a road and are driven along the roadway sections or portions by steering control equipment associated with the vehicle.

The present invention is based on and is intended to be used in the latter category and technology and is intended to be applied primarily to heavy trucks with or without connected trailers, wherein from Patent Publication U.S. Pat. No. 4,129,203-A a vehicle-related arrangement is known for letting contact springs disposed beneath the vehicle be brought upwards and downwards and sideways towards and to mechanical and electrical cooperation with or away from cooperation with non-insulated surface sections of the electric conductors (14) subject to voltage and associated with each roadway section or portion.

Utilizing an insulator (16) in a channel (18) which supports the conductors in the form of rails (14) is indicated here. A cover plate (20) provided with a slit (12) is removably attached to the upper and opposing wall portions of the channel (18), with this cover plate (20) being adjusted to a plane connecting to the upper surface (22) of the roadway section or portion.

Figure 2:
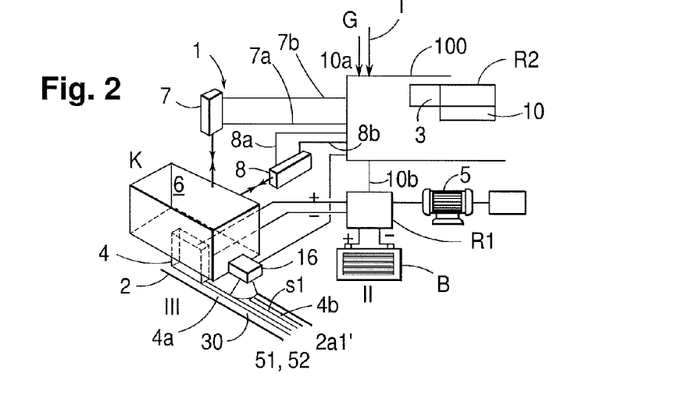
Figure 3:
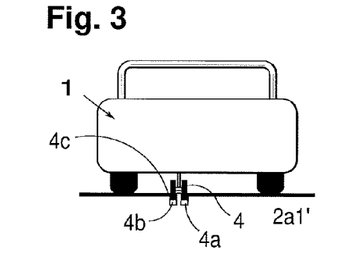
FIG. 3 shows an end view of a vehicle with its downwardly directed contact means as current collectors, in the form of sliding contacts, in cooperation with two individual contact surfaces, as conductors, strips or rails, allotted to the roadway section or portion and being under power or tension.

FIGS. 2 and 3, respectively, in the mentioned Patent Publication describe a vehicle-related table (98), to which an arm (10) is rotatably attached (94, 96, 99). Sensors (30) allotted to table (98) generate signals which with regard to their phase and magnitude indicate the direction to and distance from an axis (99) of rotation to slit (12) in the cover plate (20), which is based on changes in a generated magnetic field.

The table (98) and arm (10) can be driven over a designated mechanism (31) by a motor (32) between predetermined limits and limit switches (40, 41) positioned there.

Patent publication WO 93/10995-A discloses an earlier known system for driving electrically controllable vehicles along a road and its roadway sections or portions.

FIG. 9 in the mentioned patent publication clarifies the basic structure of the system.

It is instructed here that the extension (14) of the roadway and its roadway portions are to be provided with electrically conductive road sections (300a-300f), wherein a roadway section may be considered to correspond to a roadway portion.

The vehicle (310) has an electric motor (320) and two (312, 314) or three (312, 312' and 314, respectively) contact springs lying therebelow and being adapted for mechanical and electrical contact with the electrically conductive conductors, whose lengths are adapted to correspond to a chosen length (identically equal lengths) for utilized roadway sections or portions.

The electrically conductive conductors in the road sections (300a-399f) are disposed after each other with an intermediately oriented free space (302a-302e) so as thereby to prevent short-circuits in consequence of dragging contact springs (312, 312', 314).

All other road sections (300a, 300d, 300f) are connected here continually to a reference voltage (ground potential), whereas the remaining road sections (300a, 300c, and 300e, respectively) are either directly connectable to a source (440) of DC-voltage or can be connected over a connecting means (304a, 304b, 304c) to any appropriate electric power source (308), when a vehicle is in the vicinity.

When an embodiment having three contact springs is to be utilized the distance between them is to be chosen such, that two or three contacts always are in electric contact with two road sections exhibiting opposite polarities and that neither of the two contacts is to be able to short-circuit the open space (302a-302e) between two adjacently positioned sections or portions.

For its function the system here requires specially structured vehicles (310), wherein the chosen distance between front (314) and rear (312, 312') contacts is to be identical and furthermore to be chosen somewhat greater than the equal lengths of the roadway sections (300b, 300d).

Thus, specially structured vehicles with front and rear contacts are required and in which each one of the utilized road sections (300a-300f) is to be chosen having equal lengths and are to be positioned behind each other in the direction of motion of the vehicle with equal mutual free and intermediately lying spaces (302a-302e).

The remainder of the Patent Publication shows the existence of a single conductor or rail subjected voltage in a road section (Page 5, lines 11-13) and that a vehicle is to attract a voltage to a roadway section lying in front (Page 5, lines 19-21; page 6, lines 7-10; page 8, lines 28-32, respectively).

Furthermore it is indicated that bars or rails (16), which may be subjected to voltage, can be provided with side-positioned drainage tracks (page 9, lines 1-4).

Lack (or presence) of an activating signal is to be able to influence a control unit (38) (Page 8, lines 23-27, respectively).

The necessary distance between vehicle-associated contacts is disclosed in lines 17-20 of page 10, and utilizing activity-initiated radio signals is suggested in lines 2-4 of page 11 and lines 1-16 of page 14, respectively.

Furthermore, in lines 21-23 of page 15 and lines 1-15 of page 16, utilizing a Hallelement (240) and connecting it to an amplifier (246) is suggested. Furthermore, alternatives thereof are illustrated in lines 3-9 of page 17.

It is also known to have a vehicle driven electrically along a stretch of roadway by means of inductive transfer of energy active between a vehicle and a roadway section and a road portion laying therebelow.

As examples of this known technology reference is also made to the contents of Patent Publications U.S. Pat. No. 3,914,562-A and U.S. Pat. No. 4,007,817-A, respectively.

Patent publication WO 2007/056 804 A1 describes and discloses a plurality of means, devices and/or arrangements, which have relevance when evaluating the significant features related to the prior art and also to the present invention. However, these means, devices and/or arrangements are only mentioned in general terms, and only a few or no suggested structure is disclosed.

The contents of this patent publication will be described in the following and coordinated under the following subsections;

a. Pairs of electrically conductive contacts or strips oriented along a roadway.

b. Switching means to supply DC power to a roadway related pair of electrically conductive contacts or strips. (DC network).

c. Vehicle related transmitter.

d. Vehicle related pick-up arms.

e. DC-voltage difference between roadway related conductors, contacts or strips.

f. Orientation of the roadway related conductive strips.

g. Power supply system.

h. Detector means or arrangement.

i. Power supply to an adjacent pair of conducting strips.

j. Sensor arrangement.

k. Conditions for activating switching means.

l. Battery arrangements.

m. On-board charging engine.

n. Overload cut-off and re-close switch.

o. Safe conditions of bare electric roadway related electric conductors or strips.

p. Use of DC voltage or AC voltage to supply power to the roadway related electric conductors or strips.

q. Magnetic field sensor.

r. Snow plough and blower arrangements.

s. Electrical heating tape.

a. Pairs of Electrically Conductive Conductors or Strips Oriented Along a RoadWay.

It is suggested in the above-mentioned International Patent Publication that each pair of electrically conductive strips (members) be electrically insulated from an adjacent and another pair of electrically conductive strips, and wherein a vehicle traveling along said roadway travels over a first pair of electrically conductive strips and then travels over a next adjacent pair of electrically conductive strips and so forth.

b. Switching Means to Supply DC Power to a Roadway Related Pair of Electrically Conductive Contacts or Strips (DC-Network).

A source of direct current electricity (DC-network) is arranged to provide a DC power to the roadway related pairs of electrically conductive strips (members).

Switching means are operative to supply DC power to a pair of electrically conductive strips when a vehicle travels over that pair, said switching means being operative to turn off the supply of DC power to a pair of electrically conductive strips, when no vehicle travels over and along that pair of electrically conductive strips.

This improves the safety of the system as suggested (page 2, lines 13-17) in that switching means are operative to supply DC power to said pair of electrically conductive strips (members) only when a vehicle travels over that pair, the switching means being operative to turn off the supply of DC power to a pair of electrically conductive strips when no vehicle travels over that pair of electrically conductive strips.

Said Patent Publication further mentions (page 1, lines 7-21) a prior art system for the universal use of electrically powered roadway vehicles. A system of this kind uses a succession of 20 meter long copper strips, fixed onto a roadway surface. The respective 20 meter long copper strips were positioned end to end along each lane of the roadway and were electrically isolated from each other.

Alternating current electric power (AC-network) was applied to each section or portion.

c. Vehicle-Related Transmitter.

When an appropriate electrically powered vehicle travels over the respective sections of copper strip, a transmitter, mounted to the vehicle, turns on the power supply to that section of copper strips, where the vehicle is traveling over.

d. Vehicle Related Pick-Up Arms.

Electrically operated pick-up arms on the vehicle are adapted to contact the copper strips and to obtain electricity from the roadway-related copper strips.

This electricity from the copper strips is used to run a vehicle-related electric motor on board the vehicle (and also to activate vehicle accessories and, optionally, to recharge batteries on the vehicle).

The electricity supply to each copper strip is only turned on during 1.5 seconds, i.e. the time period during which the vehicle passes over that section of copper strips.

In the absence of a signal from a vehicle, the power to that section of copper strip remains off.

In order for the vehicle to be able to pick up electric power from the roadway-related conductors or strips positioned onto the roadway surface, the vehicle may be provided with a pick-up arm, located under the vehicle body.

The pick-up arm may comprise a flat plate hinged to the underside of the vehicle.

Two pick-up carbon brushes may be bonded to the plate, for example by an epoxy resin or adhesive.

Leads carry the power from/to each brush to the vehicle (to the motor controller and battery pack of the vehicle). (Page 7, lines 8-13)

The pick-up arm may be retracted and extended automatically.

For example, if the vehicle detects that it is traveling over a pair of electrically conductive strips (members), the pick-up arm may be automatically extended downwardly such that the brushes contact the electrically conductive strips.

In one embodiment, the electrically conductive arm is operated such, that if power is lost for more than a predetermined time period, such as from one-half to one second, the pick-up arm is automatically retracted. (Page 7, lines 14-19)

Vehicles traveling over the pairs of copper strips must be able to pick up electric power from those strips.

A large number of different designs may be used in this regard. However, one possible design is shown with reference to FIG. 2.

In FIG. 2 a vehicle 50, having wheels 52, 54, is provided with a plate 56. Plate 56 may for example be approximately 1.620 mm wide and 100 mm long.

The plate 56, as shown in FIG. 2, stretches approximately across the full width of the vehicle.

The plate 56 may be provided with one or more holes to enable air to pass therethrough to reduce the amount of down force acting on the plate when the vehicle is traveling.

The plate 56 carries two electrically conductive brushes 58, 60.

A gap 62 is located between the brushes 58, 60.

As an example, each brush may be 800 mm wide and the gap may be 20 mm wide.

The gap 62 may be filled with an electrically insulating material, suitably an insulating material that is somewhat soft and can yield without breaking, should it contact an object. (Page 14, lines 7-18)

The use of a wide pick-up plate eliminates the need for a lateral traversing mechanism for the pick up arm.

It also eliminates the need for any device to detect the vehicle's lateral position in relation to the electrically conductive strips.

All a driver has to do to achieve initial contact, is to drive along the electrically conductive strips somewhere within the vehicle's track and move the pick-up arm to the down position.

Contact will be maintained so long as the electrically conductive strips remain within the vehicle track.

Automatic steering may be used to assist in this regard on a longer drive. (Page 14, lines 27-30, page 15, lines 1-2)

The brushes 58, 60 must be able to be lowered onto the strips or retracted against the underside of the vehicle.

To this end, the brushes are mounted on a pair of pantograph arms 64, 66.

The pantograph arms keep the plate 56 (and therefore the brushes 58, 60) horizontal.

Appropriate electrical connections may be provided to enable the electrical power picked up from each of the brushes 58, 60 to be transferred to the vehicle.

The pantograph arms may carry appropriate electrical cables to transfer electric power from the brushes to the vehicle. (Page 15, lines 4-10)

e. DC-Voltage Difference Between Roadway Related Conductors, Contacts or Strips.

It is further suggested (Page 2, lines 18-22) that preferably a DC power with its voltage exposes a difference between each conductor or strip in a pair of conductors and that said voltage does not exceed 600 volts. More preferably, the DC power and its voltage difference between each conductor in a pair of conductors or strips do not exceed about 450 volts. Suitably, each conductor is at a voltage relevant to earth that does not exceed plus or minus 250 volts, more preferably not exceeding plus or minus 225 volts.

f. Orientation of the Roadway Related Conductive Strips.

The electrically conductive strips may be positioned on the roadway surface such that they are insulated from each other and from earth (the road surface). Suitably, the electrically conductive strips are laid onto an adhesive insulating base, which insulates them from each other.

The electrically conductive strips may be bonded to the roadway surface by an epoxy adhesive. Alternatively, the electrically conductive strips may be bonded to tiles that are then placed in or on the roadway surface.

g. Power Supply System.

The power supply system comprises a series of separate, electrically insulated but electrically conductive strips.

Each pair or strips represent a power supply section.

Each pair of strips may be provided with a dedicated source of DC power.

Alternatively, a source of DC power may provide direct current electricity to two or more pairs of strips.

h. Detector Means or Arrangement.

The switching means is suitably operatively associated with a detector means for detecting the presence of a vehicle, either about to move onto a pair of conductors or strips or on a pair of conductors.

For example, the coded signal may comprise an oscillating voltage similar to that used by utility companies for control purposes.

Such a control signal may have a frequency in the order of 400 kHz and a voltage of up to about 4 to 20 volts.

It will be understood that the coded signal may utilize different frequencies and different voltages from those given above. (Page 4, lines 19-29)

When one roadway section of conductors or strips is turned on, a control signal may be sent to the power supply for the next section of conductors, along the path of travel of the vehicle.

This control signal, sent to the power source for the next section of conductors or strips, is used to turn on the power supply to the next section of conductors, either shortly before or just as the vehicle arrives at the next section of conductors.

Alternatively, the control signal sent to the next section of conductors or strips may turn on the power supply to that next section of conductors at a predetermined time after the power supply to the first set of conductors or strips is activated.

In order to detect the arrival or imminent arrival of a vehicle in a section of copper strips, the vehicle may be provided with a coded signal that becomes superimposed on the strips when the vehicle travels over a section or portion of the copper strips and the brushes on the vehicle are in contact with the strips.

The coded signal is received by a detector associated with a corresponding transformer station.

The detector actuates the switching of power up to that particular section of the strips.

i. Power Supply to an Adjacent Pair of Conductive Strips.

The power supply to the next set of conductor means or strips is maintained, provided that the next set of conductors or strips detects that the vehicle enters the next set of conductors or strips within a specified time period after the power supply to the next set of conductors or strips has been turned on.

In this way, if the vehicle turns off the roadway and therefore does not enter the next set of conductors or strips, the next set of conductors or strips will not detect the presence of the vehicle and therefore will shut off the power supply shortly after it has been turned on.

In this embodiment, the adjacent sections of conductors "talk" to each other and interact with each other to turn on the power supply to each roadway section with its strips either just before or just as a vehicle arrives at each section.

j. Sensor Arrangement.

A sensor arrangement may be located towards the "downstream" end of each pair of strips.

The sensor arrangement may, for example, be a current flow sensor, positioned below or adjacent to one of the electrically conductive strips.

When a vehicle is near the end of a roadway section (of electrically conductive strips), the sensor will sense the resultant current flow and then send a signal to the next section of electrically conductive strips to turn on the electricity supply to the next section in "anticipation" of the imminent arrival.

This signal may be sent via cable. The "anticipatory" signal is valid for a short time only, say 2 seconds, and if a vehicle has not arrived at the next section within that time, the next section is turned off.

k. Conditions for Activating Switching Means.

The switching means may be arranged such that the signal, that is used to turn on the next pair of conductive strips, must be larger than a predetermined minimum value in order to activate the switching means and turn on the next pair of conductive strips.

In this manner, if the next pair of conductive strips is subject to conditions of high electrical leakage, the signal will be lower than the minimum required to turn on the next pair of strips.

This is effective to minimize excessive electrical leakage which could lead to unacceptable power wastage and/or to damage to the transformer/rectifier. (Page 4, lines 28-29, page 5, lines 1-4).

The use of a coded signal also allows for the possibility of enhanced operation and safety by incorporating an electricity leakage test into the apparatus.

In these instances, an electrical leakage detection means may be provided to prevent the next section of conductors or strips from turning on.

Detection of electrical leakage may occur by requiring the coded signal superimposed on each section of conductors or strips to exceed a predetermined activation threshold value before the next section of conductors or strips will be turned on.

In this fashion, superimposing the coded signal onto the conductors or strips will result in the coded signal representing the criteria not exceeding the predetermined threshold value if conditions of high electric leakage are present. Thus, the next section of conductors or strips will not be turned on in such situations. (Page 8, lines 15-28)

l. Battery Arrangements.

The vehicle may be provided with one or more batteries to store electric power or energy.

The batteries may be charged using electricity received from the roadway related electrically conductive strips.

In some embodiments, the DC voltage of the electrically conductive strips is such that it is equal to the normal charging voltage of each battery pack in the vehicle.

This allows for the vehicle motor to have an essentially seamless transition to and from battery and on-road conductors or strips, whenever there is a break and then a resumption of the on-road conductors or strips. (Page 6, lines 29-30, page 7, lines 1-5)

m. On-Board Charging Engine.

The vehicle may alternatively or additionally be provided with one or more of an on-board charging engine or a regenerative braking system to allow for recharging of the batteries. (Page 7, lines 6-7)

n. Overload Cut-Off and Re-Close Switch.

Each transformer may have an overload cut-out and re-close switch.

This switch suitably operates on the DC side of the transformer and a rectifier. Each DC output line from the transformer and rectifiers may have independent overload switches.

The overload cut-out and re-close switches may be set such that if three re-close attempts are unsuccessfully made, the section is shut down and a signal is automatically sent to the control panel to indicate a fault.

Vehicles may then proceed across this dead section using an on-board battery power system. (Page 12, lines 10-16)

o. Safe Conditions of Bare Electric Roadway Related Electric Conductors or Strips.

A question may be raised as to whether bare electric conductors or strips onto a road surface can be safe? In the system here proposed, they are safe.

In particular, the present invention uses mains power but delivers DC voltage at relatively low volts.

Moreover, each copper conductor or strip is insulated from the roadway surface and from the other copper conductor or strip in its respective pair.

Thus, standing on one of the conductors or strips will not complete any circuit and therefore little or no current will flow through a person standing on one of the copper conductors or strips.

Further, the DC voltage supply to the conductors or strips is created by transforming and rectifying high voltage, three-phase (alternating current) AC-power, to give a positive DC-power to one conductor or strip and an equal negative DC-power to the other conductor or strip in each pair of conductors or strips. (Page 12, lines 19-20)

p. Use of DC Voltage or AC Voltage to Supply Power to the Roadway Related Electric Conductors or Strips.

The use of DC voltage rather than AC voltage contributes to the electrical safety of the system.

The actual DC voltage that is supplied to the pairs of copper conductors or strips will depend upon several factors.

For example, the lower the standard DC voltage selected, the lower will be the perceived electrical safety risk, the lower will be the actual energy leakage, when a roadway is wet and the conductors or strips are on and the fewer the number of battery cells in each vehicle to provide an on-board power supply.

On the other hand, the weight of copper conductors or strips and/or the number of transformers needed for the on-road installation is inversely proportional to the square of the standard voltage.

That is to say, other things being equal, if the voltage is halved, the weight and cost of copper material needed will rise fourfold.

It has been found that possible standard voltages may lie anywhere between about 100 and 600 DC voltage. (Page 12, lines 3-12)

q. Magnetic Field Sensor.

An array of magnetic field sensor may be placed across front and rear of the vehicle (Page 20, lines 3-9) to sense the position of the conducive strips.

r. Snow Ploughs and Blower Arrangements.

The use of snow ploughs and blower arrangements is also suggested. (Page 21, lines 28-30.)

s. Electrical Heating Tape.

It is also suggested the use of an electrical heating tape beside each conductor or strip to aid the clean removal of snow and ice in winter time. (Page 22, lines 1-3.)

This invention has the purpose of concentrating to an arrangement related to vehicles for operating contact means or current remover disposed beneath the vehicle upwards and downwards so as to be able to coordinate the utilization of a first and a second source of energy allotted to the vehicle, such as a diesel generator and a set of batteries, as well as a source of power external to the vehicle and disposed along the stretch of a roadway and its roadway sections and having its upwardly facing tracks connecting to each other from roadway section to roadway section with one, two or more parallel electric conductors introduced deposited in each roadway section.

The arrangement is based on utilizing a pivotally arranged structure in the form of an arm shaped contact means.

DISCLOSURE OF THE PRESENT INVENTION

Technical Problem

If the circumstance is considered, that the technical considerations that a person skilled in the relevant technical art will have to carry out in order to offer a solution of one or more posed technical problems are on the one hand initially a necessary insight into the measures and/or the sequence of measures which are to be performed and on the other hand a necessary choice of the one or several means which are required, the following technical problems must be considered to be relevant in consequence hereof in producing the present subject of invention.

Considering the earlier standpoint of technology, as it has been described above, it should therefore be seen as a technical problem to be able to understand the significance of, the advantages related to and/or the technical measures and considerations which will be necessary in an adapted system for conveying an electrical, and by i.a. one or more batteries in a set of batteries, conveyable vehicle along a stretch of a roadway and its roadway portions, wherein said system is to comprise; a plurality of road sections or portions for subdividing up the stretch of the roadway, wherein each one of these roadway portions is allotted one or more elongated tracks or slits having introduced therein current supplyable and under voltage placeable electrically conductive conductors or strips, connectable over a switch to one or more power sources as stationary electric stations, serving as an external source of power (designated as a third source of power in the following) of the vehicle so as to thereby i.a. charge said set of batteries associated with the vehicle, which set is to be able to propel the vehicle directly along the roadway sections, and one or more vehicles, propellable over an individual electric motor or motors, and wherein the respective vehicle exhibits a control circuit, controlling the necessary power for creating necessary power and/or speed control, indicating the possibility of utilizing equal or different lengths of parallel electric conductors or strips, which may be subjected to electric power or voltages, related to mutually electrically insulated road sections so as to therein offer a possibility of choosing the lengths of the conductors and road sections in response to established requirements of a continuous supply of energy to the vehicle and its set of batteries and wherein the lengths of the respective roadway section to advantage can be chosen considerably longer than the total length of the vehicle, so that no adaptation of the lengths of the road sections to any standard lengths of the vehicles will be required, such as in known technology.

There is a technical problem or a technical consideration in being able to understand the significance of, the advantages related to and/or the technical measures and considerations which will be required for instructing, in an arrangement related to vehicles as indicated above, and utilizing the contact means related to the vehicle which is to be adapted to comprise at least one elongated arm, whose first end portion is pivotably or rotatably fastened to the underside (bottom) of the vehicle and whose second or other end portion is adapted to carry said contact means.

There is a technical problem in being able to understand the significance of, the advantages related to and/or the technical measures and considerations which will be required for letting the lower portion or underside of the vehicle be provided with one or more sensors, intended for being able to sense the existence of and the orientation of a track allotted to the roadway and therein to transfer sensed information to a control means.

There is a technical problem in being able to understand the significance of, the advantages related to and/or the technical measures and considerations which will be required for having the control equipment adapted to comprise a control circuit, which in a sensed existence and a sensed orientation within a coverage area is to be adapted over a generated output signal to be able to actuate means for horizontal movement and/or lowering the contact means or elevating it in a vertical movement.

There is a technical problem in being able to understand the significance of, the advantages related to and/or the technical measures and considerations which will be required for having the one end portion of the elongated arm oriented in front of the second end portion, counting in the momentary direction of motion of the vehicle.

There is a technical problem in being able to understand the significance of, the advantages related to and/or the technical measures and considerations which will be required for letting the one end portion of the elongated arm be oriented behind the second end portion, counting in the momentary direction of motion of the vehicle.

There is a technical problem in being able to understand the significance of, the advantages related to and/or the technical measures and considerations which will be required for letting said contact means be assigned an elongated extension and being able to be pivotably or rotatably attached to the other end portion of the elongated arm over a vertical axis of rotation.

There is a technical problem in being able to understand the significance of, the advantages related to and/or the technical measures and considerations which will be required for letting the contact means, with its elongated shape and in relation to a vertical plane allotted to the vehicle, such as a plane connecting to a chosen direction of motion, have an angular value, with respect to the elongated arm, corresponding to the angular value of the arm with respect to a vertical plane allotted to the vehicle.

There is a technical problem in being able to understand the significance of, the advantages related to and/or the technical measures and considerations which will be required for letting the contact means be adapted to support at least two contact means or contact surfaces disposed behind each other.

There is a technical problem in being able to understand the significance of, the advantages related to and/or the technical measures and considerations which will be required for letting conductors, which may be placed under voltage and current, be adapted to extend along said elongated arm in the direction of one of its end portions and over the vehicle and to a circuit distributing the activation one or more sources of power.

There is a technical problem in being able to understand the significance of, the advantages related to and/or the technical measures and considerations which will be required for letting sensor units, allotted to the vehicle such as side related, be connected to the control equipment and intended to indicate a maximized limit value of the contact means.

There is a technical problem in being able to understand the significance of, the advantages related to and/or the technical measures and considerations which will be required for at an indicated maximized limit value of the contact means, when the latter moves in a direction from its final position, activating over the control equipment means for being able to elevate the contact means vertically out of cooperation with the track and its conductor.

There is a technical problem in being able to understand the significance of, the advantages related to and/or the technical measures and considerations which will be required for, in an indicated maximized limit value of the contact means, when the latter moves in a direction towards its final position, activating over the control equipment means for being able to lower the contact means vertically down towards and for cooperation with the track and its conductor means.

THE SOLUTION

As its starting point this invention utilizes the known technology indicated by way of introduction and is based on a vehicle-related system for adapting in an electrically, i.a. by one or more batteries or a set of batteries, conveyable vehicle being driven along a stretch of a roadway and its associated roadway sections or portions, this system may comprise; a plurality of roadway sections or portions subdividing the extension or stretch of the roadway, wherein each one of these road sections or portions is allotted one or more elongated tracks, grooves or slots, having introduced therein conductor bare surfaces, such as conductors or strips, which may be supplied with power of current and which may be placed under voltage by means of a switch, to one or more power sources external to the vehicle, such as electric stations, so as to thereby be able to charge said set of batteries allotted to the vehicle, but primarily over said set of batteries driving the vehicle along the extension of the roadway and its roadway portions, and one or more vehicles which may be driven by an electric motor or motors and wherein the respective vehicles exhibit a power control circuit for required power adapted for creating a required power and/or speed control, wherein said vehicle, on its underneath side, is provided with an up and down and sideways, respectively, counted crosswise to the direction of transportation of the vehicle, displaceable contact means and in which said elongated tracks, grooves or slots extend along the roadway and its roadway sections or portions and wherein said contact means is coordinated with a vehicle related control equipment or an arrangement for creating an adaptation of the contact means at least to offer mechanical and electrical contact to said conductor or strip, wherein a coordination between the voltage-carrying conductors allotted to the roadway sections or portions and the contact means of the vehicle occurs over coordinated current removers, such as in the form of contact springs, adapted for mechanical and electrical cooperation with respective ones of the voltage-carrying conductors or strips.

This invention has the purpose of indicating a further development of the arrangement mentioned above, and in the system mentioned above, and apart from this to instruct building on the prerequisites mentioned above by letting the contact means related to the vehicle be adapted to comprise at least one elongated arm, one end portion of which is rotatably attached to the lower portion of the vehicle and the other (opposite) end portion of which is adapted to support said contact means, wherein one or more sensors are to be allotted to the lower portion of the vehicle and are to be intended to sense the existence of and the orientation of a track positioned in the roadway and to transfer this sensed information to a control equipment, with the control equipment being adapted to comprise a control circuit, which in a sensed existence of and a sensed orientation of, falling within a defined area of coverage, is adapted to effect a horizontal movement and/or a lowering or elevating movement for said contact means.

As a proposed embodiments falling within the frame or scope of the present invention an arrangement is particularly suggested, in which one (first) end portion of an elongated arm is to be positioned in front of the other (second) end portion, counting in the momentary direction of movement of the vehicle.

It is particularly indicated or suggested that said contact means are to be allotted an elongated shape and extension and are, over an axis of rotation, to be rotatably attached to the other end portion of the elongated arm.

It is further proposed that, in relation to a vertical plane allotted to the vehicle, such as a plane connecting to a chosen direction of motion, the contact means are with their elongated shape to be able to have a horizontal angular value, as compared to the longitudinal extension of the elongated arm, and their center line corresponding to the angular value of this arm, in relation to a horizontal plane allotted to the vehicle.

The contact means are to be adapted to support at least two contact means disposed behind each other or parallel to each other for common removal of current from the one or two electrically conductive conductors, related to the third source of energy.

Contact means or conductors allotted to the vehicle, and being able to be placed under voltage and current, are adapted to extend along said elongated arm in the direction towards the one end portion thereof and furthermore over to the vehicle and to one or more circuits distributing of energy.

Furthermore it is proposed that sensor units allotted to the vehicle, such as side related sensor units, are to be connected to the control equipment and intended to indicate a maximized limit value of the horizontal displacement of the contact means.

At an indicated maximized limit value of the contact means, when the latter moves in a horizontal direction from its final position, a means is activated over the control equipment for being able to move the contact means vertically out from cooperation with the track and its electrically leading conductors.

At an indicated maximized limit value of the contact means, when the latter moves in a horizontal direction towards its end position, a means is activated over the control equipment for being able to lower or raise the contact means to and into cooperation with the track and its electrically conducting conductor surface or conductors or raise said contact means out of cooperation.

ADVANTAGES

The advantages which primarily must be considered to be characterizing of the present invention and the thereby indicated specific significant characteristics are that thereby prerequisites have been created for, in a vehicle-related arrangement according to the preamble of claim 1, indicating or suggesting that the vehicle and its vehicle related contact means is to be adapted to comprise at least one elongated arm, one end portion of which is rotatably attached to the underneath side of the vehicle and the other end portion of which is adapted to support said contact means.

Furthermore, one or more sensors are to be allotted to the lower portion of the vehicle and to be intended to sense the existence of and an orientation of a track and to transfer sensed information to control equipment.

The control equipment is then to be adapted to comprise a control circuit which in a sensed existence and a sensed orientation of the track, within a covering area, is to be adapted to actuate a means lowering said contact means vertically.

If such existence and/or orientation is not at hand, the control circuit is to effect means elevating the contact means vertically out of contact with contact surface within a groove, which means can be the same as the means lowering the contact means.

The primary subject matter of a control unit and a charging system related to a vehicle, in accordance with the present invention, is disclosed in the characterizing portion of the following patent claim 1.

SHORT DESCRIPTION OF THE DRAWINGS

Prior art and presently proposed embodiments, exhibiting the significant characteristics related to the present invention, will now, as an example, be described more specifically with reference to the accompanying drawings in which.

DESCRIPTION OF THE PRESENTLY PROPOSED EMBODIMENTS

By way of introduction it shall be mentioned that in the following description of presently proposed embodiments exhibiting the significant characteristics related to the invention and being clarified by the figures, illustrated in the accompanying drawings, we have chosen terms and specific terminology with the purpose of thereby primarily clarifying the concept of the actual invention.

However, in this connection it should be noted that the terms chosen here shall not be seen as limiting solely to the terms utilized and chosen here and it should be understood that each such chosen term is to be construed so that it in addition will be able to include all technical equivalents which operate in the same manner or essentially the same manner so as thereby to be able to achieve the same or essentially the same purpose and/or the same technical result.

Thus, with reference to the accompanying drawings the basic prerequisites of the present invention are shown schematically and in detail, with the significant characteristics related to the invention being concretized in consequence of the now proposed and in the following more specifically described embodiments.

Figure 1A:
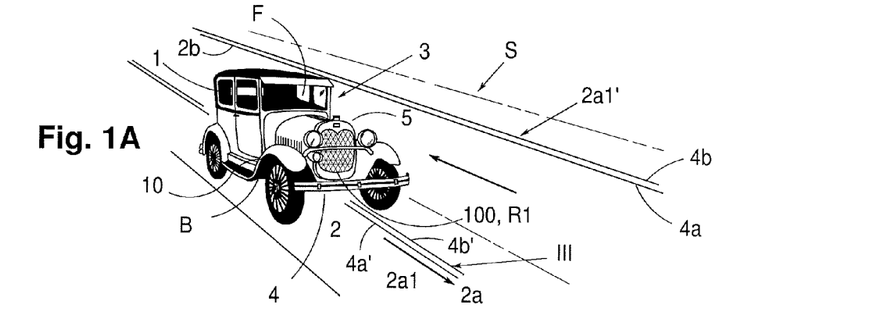
FIG. 1A shows a perspective view of a vehicle, illustrated as a Ford Model A, converted to being battery powered and having an electrically powered engine or motor, a control circuit, controlling the power for speed control and adaptation to an instantaneously acting load and necessary power as well as a control arrangement or control equipment, intended for use in driving and steering the vehicle.
Figure 4:
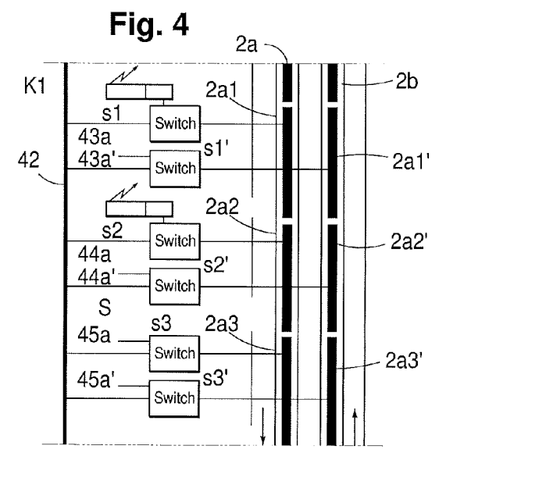
FIG. 4 shows an example of an electric arrangement in which a number of roadway sections or portions are provided with parallel contact surfaces, as conductors or strips under power or tension, each one being connectable over a switch to its vehicle external or peripheral electric station and in which roadway section or portion after roadway section or portion may be activated and are placed under power of voltage by activating a coupling means or a switch over a control unit, as said vehicle passes roadway section after roadway section.

Thus, FIG. 1A shows a system S adapted for driving an electrically, and by one or more batteries or a set of batteries, propellable vehicle 1 along a stretch of a roadway 2 and its roadway sections or portions 2a1 and 2a1'. (FIGS. 1 and 4).

Exteriorly the vehicle 1 consists of a Ford Model A, but this is converted to a battery powered vehicle, having a continuous access to an external "third" source of power or energy, which here is designated III and including a stationary station s1.

The vehicle 1 according to the invention is also to comprise a not shown steering arrangement 3 or steering equipment so that a driver F (not shown) can drive and steer the vehicle 1 along said stretch of roadway 2 and its road section or portion 2a1.

Vehicle 1 would also be able to include a gear box and other parts and components which are required for advancing the vehicle, but as these parts are well-known to a person skilled in the art they will not be described in detail.

However, an electrically driven vehicle 1 does not need a gear box as speed control and adapted power can occur over known electric and electronic circuits.

Figure 1B:
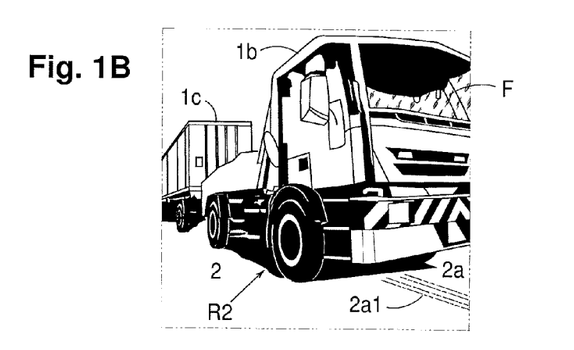
FIG. 1B shows a perspective view of a truck with a trailer and with a control circuit controlling the power, in accordance with the basic principles of FIG. 1A.

In the same manner as FIG. 1A, FIG. 1B shows an electrically propellable truck 1b with a connected trailer 1c along the stretch of roadway 2 and 2a and its associated roadway section or portion 2a1.

Figure 1C:
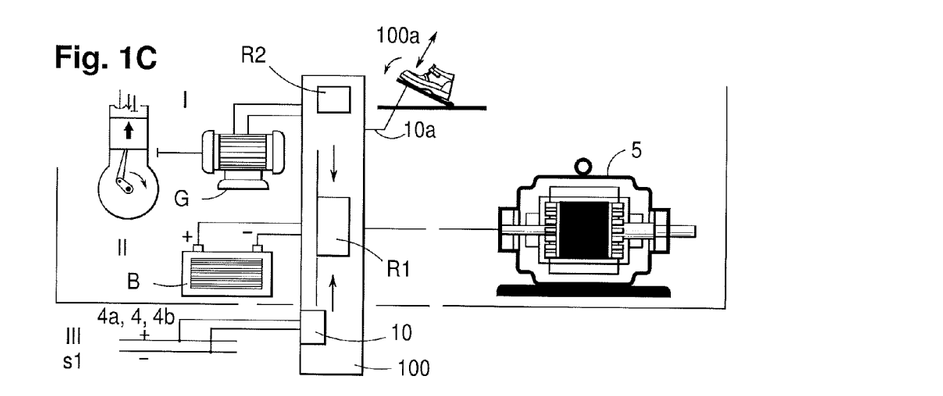
FIG. 1C shows in an overview that three vehicle-related power sources, a first one I, a diesel generator, a second one II a battery or a battery set, and a third one III, an external source of power to the vehicle, feeding electric power to parallel conductor surfaces, such as rails or strips, which may be subjected to power or voltage and which surfaces are arranged in continuous grooves in a roadway, and coordinated to a vehicle-related control circuit, which in response to a necessary supplied power to an electric motor makes possible the selection of all or a combination of the powerfeeding sources of energy, wherein the power control is illustrated here as a throttle, having its motion related to a control circuit R2.

FIG. 1C clearly shows two vehicle-related and vehicle-associated sources of power, which here are designated I and II, a first one in the form of a diesel generator G, a second one in the form of a battery or a set of batteries B, and a third one III in the form of a source of power, positioned externally of the vehicle 1, here taking the form of parallel conductive surfaces 4a, 4b, such as conductors, rails or strips, which may be subjected to power or voltage over switching means, and introduced into tracks, grooves and/or a cavity along each roadway section or portion along the entire stretch of the road 2 and 2a.

In FIG. 1C the three sources of power are coordinated to a vehicle-related power control circuit 100, which in response to a power supplied to an electric driving motor 5 chooses all or a combination of the three power feeding energy sources I, III, and III, respectively. Here the power control is illustrated as a throttle 100a, the movement of which upwards and downwards, is connected to a control circuit R2 in said power control circuit 100, which in turn is related to a circuit R1, distributing power and energy between the three power sources.

Figure 1D:
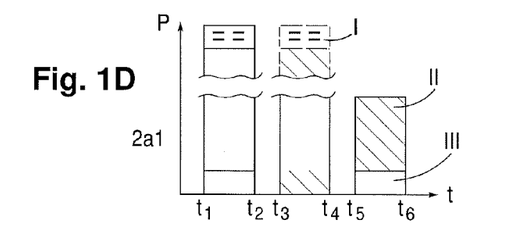
FIG. 1D illustrates a P/t-diagram (power/time) wherein full power or reduced power is to be transferred over the control circuit to the vehicle, to pass along a roadway, its road sections or portions and its conductors or strips, FIG. 2 basically shows an electric arrangement related to a vehicle having a control equipment for controlling a current collector or commutator arranged against electric contact surfaces, with paired conductors shaped as rails or strips for enabling parallel operation of an electric vehicle-related motor from one or both of the two power sources (first and second ones) related to the vehicle and/or from a stationary third source of power related external to the vehicle or a peripheral third source of power.

In a P/t (power/time) diagram FIG. 1D illustrates how full power or reduced power can be distributed and transferred for passage of the vehicle 1 along different roadway sections or portions 2a1 of a roadway or stretch of a roadway 2 with the help of said circuit R1 and control circuit R2 and the power control circuit 100.

Between time slots or moments $t_1$-$t_2$ it is basically illustrated how a complete removal of power from the three power sources I, II, and III, respectively, can be carried out, with the power taken out from the first power source I, illustrated at the top, the power taken out from the second power source II, illustrated there below, and the power taken out from the third power source III, illustrated at the bottom.

Reduced removal of power from the first and second power sources I and II is basically illustrated between the moments of time $t_3$-$t_4$, whereas the third power source III is shown completely disconnected in this case.

Reduced removal of power from the second and third power sources II and III is illustrated basically between the moments of time $t_5$-$t_6$.

During this time period $t_5$-$t_6$ full power can be achieved from the second power source II, and a small surplus can be permitted to be fed to the motor 5 and trickle charge the battery set B.

The invention is based on that the set of batteries B and the second power source II but particularly the third power source III primarily shall, over the distributing circuit R1, supply motor 5 with power and for this purpose the set of batteries B will have to have stored power and apart from this will have to be dimensioned so as to drive mofor 5 at full power.

The set of batteries B is primarily to be trickle charged via the third power source III and secondarily to be trickle charged or charged over the first power source I.

The power or energy from the first and third power sources I and III can be chosen to be 5-30% of the power or energy associated with the second power source II, such as around 25%.

The supply power or voltage to motor 5 can be chosen to +400 VDC and −400 VDC, i.e. the voltage value of 800 VDC is to be fed to the motor 5.

System S in FIG. 1A is then primarily to comprise one or more over an individual electric motor 5 or motors electrically powerable vehicles 1, with respective vehicle exhibiting a power distributing and/or controlling control circuit R1, within said power control circuit 100, and for creating a necessary power and/or a speed control, via a control circuit R2 and a throttle arrangement 100a.

The necessary output power is to be supplied primarily by the vehicle-internal second power source of energy II, which secondarily is to be placed under trickle charging from the third power source of energy III.

The stretch of a roadway 2 is in FIG. 4 shown divisible into roadway sections or portions 2a (2a1, 2a2, 2a3); 2b (2a1', 2a2' and 2a3'), wherein each one to advantage can be allotted to an external third power source III, which here is illustrated as a number of electric stations s1, s2, s3, s1', s2', s3'.

Of the third power source III, external to the vehicle 1 and/or the first power source I, associated with the vehicle, one or both can thereby be utilized for supplementary charging the set of batteries B of the vehicle 1, during an adapted time sequence of power removal from this set of batteries.

Within the scope of the invention there is also the possibility of in addition to driving the vehicle 1 via the set of batteries B and in supplementary charging the set of batteries B along the roadway sections or portions and the stationary electric station s1 or any of the third power source of energy III, any additional necessary power and energy for driving the vehicle 1 over a road section or portion 2a1 can be supplied via the first power source I associated with the vehicle.

FIG. 2 basically shows an electrical/mechanical switching arrangement K related to a vehicle 1 in a schematically illustrated vehicle-related arrangement in the form of control equipment 10 for controlling a contact member or a current remover or collector 4, associated with the vehicle 1, and to an electric contact with pairs of contact surfaces, as leads or strips, which may be placed under power or voltage and in the form of rails or strips 4a, 4b for the possible common driving in parallel of an electric motor 5 from the set of batteries B and/or from the stationary station s1 and/or from the diesel generator G.

In this case current remover or collector 4 is related to a support 6, which may be displaced upwards and downwards vertically by means of a first electric auxiliary motor 7 and may be moved sideways back and forth by a second electric auxiliary motor 8.

The means and the control of auxiliary motors 7, 8, which are required for this movement with the assistance of sensors, are not shown in detail.

Both auxiliary motor 7 and auxiliary motor 8 may be activated in a movement directed forward and backward, wherein a first motion is activated over a first signal on a first conductor 7a and a first signal over a first conductor 8a, respectively, whereas a second (opposite) motion is activated by means of a second signal over conductors 7a and 8a, respectively, while the instantaneous setting positions of motors 7, 8 and support 6 are evaluated by one or more, not shown, sensors and are indicated by means of a generated signal on a second conductor or lead 7b and 8b, respectively.

These signals on the first conductors 7a, 8a are generated in a central unit or a power control circuit 100 having a control equipment 10, and signals on the second conductor 7b and 8b are generated in the same central circuit 100, while utilizing position sensors (not shown).

Said power control circuit 100 with control equipment 10 is a complex unit, which i.a. over a sensor 16 is to be able to sense the existence of and the orientation of conductor surfaces, as conductors or strips 4a, 4b, and thereafter lower the current remover or collector 4 by means of auxiliary motor 7 to electric contact with these two conductors 4a, 4b, which here are illustrated as being placed under voltage.

Over a connection 10a to power control circuit 100 and its control circuit R2 the power and energy, which over circuit R1 is distributing the energy sources, is supplied to motor 5, and is here controlled by throttle arrangement 100a. For this purpose circuit R2 will have to be controlled directly by said throttle arrangement 100a (FIG. 1C) so as to supply motor 5 with a required power over the circuit R1.

In the illustrated position the current collector or remover 4 conduct current and voltage from the third power source III over to the power and energy distributing circuit R1.

The latter or a control circuit R2 senses the power requirement of motor 5 over its central unit 100 and primarily feeds motor 5 with the power it needs, according to the input signal on the connection or conductor 10a, and generated output signal on the connection or conductor 10b so as thereby to load the stationary system s1 and supplement the power and energy requirements over the battery set B.

Parallel connection of the vehicle external third power source III and the first and second power sources II and III within the vehicle 1 can here be carried out over circuits R1 and control circuit R2 and with the assistance of power control circuit 100.

Information about a desired speed and thereto related power of vehicle 1 is supplied to power central circuit 100 over conductor 10a, and circuit R1 is affected over conductor 10b via internal circuits, which are not shown, and the function of the control circuit R2, and control equipment 10.

FIG. 3 shows an end view of a vehicle 1 with its downwardly directed current collector or remover 4 in mechanical and electrical cooperation with the two live contact surfaces, as conductors, rails or strips 4a, 4b associated with road portion 2a1' and a connection 4c to ground.

FIG. 4 shows an electric switching arrangement K1, in which roadway section or portion after roadway section or portion 2a1, 2a2, 2a3 and 2a1', 2a2' and 2a3', respectively, with their station or stations s1, s2, s3 and s1', s2', s3', respectively, can be activated and made to conduct power as voltage from one and the same controlled power source 42 over each switching means 43a, 44a, and 45a for one stretch of a roadway 2a and 43a', 44a' and 45a' along the opposite stretch of a roadway 2b, depending on whether a vehicle 1, 1b will pass along the electrically separated but with longitudinal tracks or grooves coordinated roadway 2a, 2b sections or portions.

For this a number of switches or connecting means for connecting and disconnecting stations s1, s2 . . . will be needed, wherein this connecting and disconnecting can occur over stationary sensors (not shown) related to the section or portion of the roadway.

This invention is based on the prerequisites mentioned above and shows according to FIG. 5 that the vehicle-related contact means 4 as current remover (such as a pantograph structure) is adapted to comprise an elongated arm 50, one (first) end portion 50a of which is rotatably attached to the underside (bottom) of the vehicle 1 and the other (second) end or free portion 50b is adapted to support said contact means 4, 4' either oriented parallel or in series.

Figure 5:
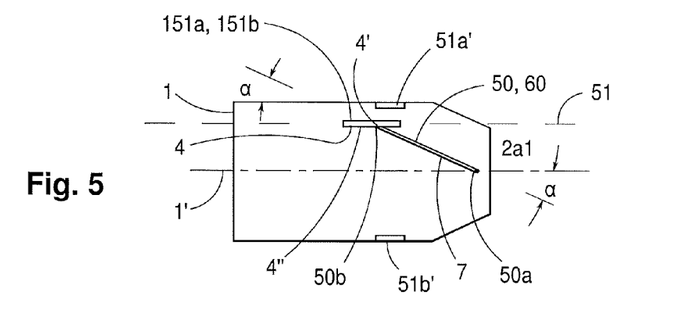
FIG. 5 shows a vehicle from the underneath side with one arm being rotatably disposed adjacent to one of its end portions and contact means or current remover being disposed adjacent to the other of its end portions, supporting said contact means of the arm.

One or more sensors 151a, 151b are disposed at the underneath portion of vehicle 1 and are intended to be able to sense the existence of and the orientation of a side related track 51 and to transfer sensed information to the control equipment 100.

The control equipment 100 is adapted to comprise a control circuit 100b (see FIG. 6) which in a sensed existence and a sensed orientation of track 51 within a chosen area of coverage is adapted to actuate the means 7 or 7' lowering or lifting said contact means 4, 4'.

One end portion 50a of the elongated arm 50 is disposed, counting in the momentary direction of motion of the vehicle, in front of the other or second end portion 50b.

One end portion 50a of the elongated arm 50 is disposed, counting in the momentary direction of motion of the vehicle, behind the other or second end portion 50b.

Said contact means 4, 4' are each allotted an elongated extension and is over a vertical axis of rotation 4" rotatably attached to the other end portion 50b of the elongated arm 50.

In relation to the vertical central plane 1' allotted to the vehicle 1, such as a plane connecting to a chosen direction of motion, the contact means 4, 4' with its elongated shape is to be able to have an angular value α with regard to the elongated arm 50 corresponding to the angular value α of this arm with regard to a vertical plane allotted to the vehicle.

Figure 6:
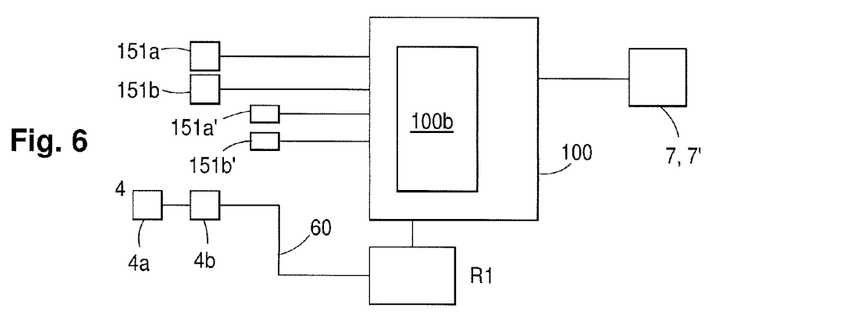
FIG. 6 illustrates, in the form of a block diagram, a proposed circuit arrangement related to the embodiment of FIG. 5, while utilizing sensors, a control circuit or a central unit.

Contact means 4, 4' are adapted to carry at least two contact devices, disposed behind each other or parallel to each other and here designated 4a and 4b in FIG. 6.

Conductors 60 which may be placed under voltage and which may conduct current are adapted to extend from contact means 4 (4a, 4b) along the mentioned elongated arm 50 in a direction towards one of its end portions 50a and over to the vehicle 1 and to a controlling circuit R1 distributing one or more power sources.

Sensor units 151a, 151b; 151a', 151b' allotted to vehicle 1 and being side-related, if desired, are connected to control equipment 100 and are intended to indicate a maximized limit value of said contact means 4.

At an indicated maximized limit value of contact means 4, when the latter moves in a direction from its end position, a means 7' is activated over control equipment 100 for enabling contact means 4 to be lifted from cooperation with its track 51 and its conductors 4a, 4b.

At an indicated maximized limit value of contact means 4, when the latter moves in a direction towards its end position, a means 7 is activated over control equipment 100 for enabling the lowering of contact means 4 towards and into cooperation with track 51 and its conductors 4a, 4b.

Figure 7:
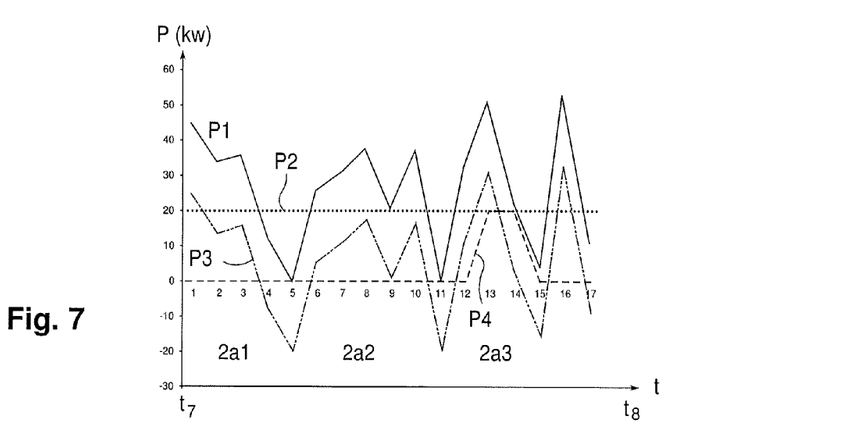
FIG. 7 illustrates, similarly to FIG. 1D, a diagram of power/time, illustrating the instantaneous removal of power when the vehicle passes along roadway or roadway section.

With reference to FIG. 7 a diagram over power/time is illustrated, applicable between moments of time $t_7$ and $t_8$, when vehicle 1 is to pass road sections 2a1, 2a2, and 2a3, with different requirements of power.

Thus, curve P1 illustrates the distribution in time of the required variable power to motor 5 of vehicle 1, in kW, curve P2 intends to illustrate the level of power (here a chosen constant) from the third source of energy III, curve P3 intends to illustrate the varying power which the second source of energy II represents, and curve P4 has the purpose of illustrating the temperable power that the first source of energy I can generate.

Figure 8:
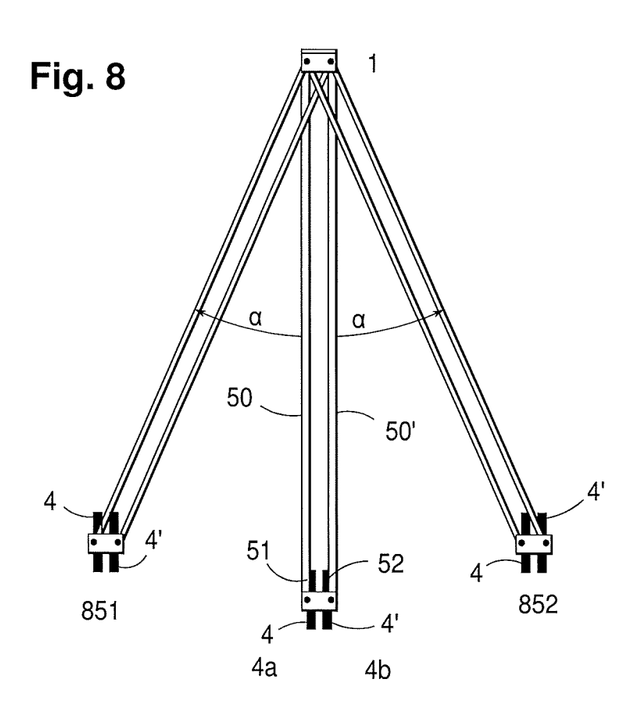
FIG. 8 shows a mechanical arrangement with two parallel rods or arms for securing the current remover, having two contact means or surfaces disposed parallel to each other independently of the orientation of the parallel arms.

In feeding a vehicle 1 with electricity from a cavity 30 in the roadway, at least one arm attached to the vehicle is utilized as shown in FIG. 5 and FIG. 8.

When the vehicle 1 moves back and forth along its lane 2 the angle α of the arm 50 with regard to the track 51, 52 will vary. A contact which is fixed as compared to the movable arm 50 will then have a varying angle with regard to the track 51. This is inappropriate as it may cause the contacts 4, 4' to come down towards track 51 transversely.

An example of how this problem can be avoided by a mechanical embodiment is shown in FIG. 8.

Two parallel arms 50, 50' are carrying the parallel contact means 4, 4'; 4a, 4b and which are running along its tracks 51, 52 or grooves. These arms 50, 50' are pivotable attached to the vehicle 1, which means that the two parallel arms 50, 50' may cooperate with side-related tracks 851, 852 and still have a parallel orientation.

Some of the following reference numerals have been introduced into FIGS. 1 to 4;
 a. 1. Vehicle illustrated as a Ford Model A.
 b. 1b. Truck
 c. 1c. Trailer to truck B.
 d. 2. Stretch of a roadway
 e. 2a. Roadway in one traveling direction
 f. 2b. Roadway in an opposite traveling direction
 g. 2a1, Roadway section in one traveling direction
 h. 2a1', Roadway section in an opposite direction
 i. 3. Steering equipment
 j. 4. Vehicle related contact means as current remover
 k. 4a. Electrical conductive first rail
 l. 4b. Electrical conductive second rail
 m. 4c. Roadway section related electrical conductor
 n. 4a', Electrical conductive first surface
 o. 4b". Electrical conductive second surface
 p. 5. Vehicle related DC-motor
 q. 6. Support for vehicle related contact means (j)
 r. 7, 8. Auxiliary motors
 s. 10. Control equipment for contact means (j)
 t. 30. Canalization for electric conductors (k, l, m) and including grooves (u, v.)
 u. 51. First roadway section related groove
 v. 52. Second roadway section related groove
 w. 100. Power control circuit
 x. I. First vehicle related power source
 y. II. Second vehicle related power source
 z. III. Third power source, vehicle external
 aa. F. Driver (not shown.)
 bb. R1. Energy distributing and three power sources controlling circuit
 cc. R2. Control circuit for energy distribution (Speed control)
 dd. S. Vehicle and roadways related system.

The current remover or the contact means is to be seen as a current collector.

The invention is of course not limited to the embodiment disclosed above as an example, and it can be subjected to modifications within the frame of the inventive concept illustrated in the following claims.

It should be particularly noted that each shown unit and/or circuit can be combined with each other illustrated unit and/or circuit within the frame of being able to reach the desired technical function.

The invention claimed is:

1. A vehicle-related arm-shaped contact means related to an arrangement or system for propelling an electrically propellable vehicle, by one or several batteries or a set of batteries, along a roadway comprising a plurality of roadway sections, the system comprising:
 a plurality of roadway portions for subdividing the roadway into said roadway sections, wherein each one of the roadway sections comprises one or more elongated tracks, slits or grooves having conductors introduced therein adapted to be supplied with current and put under voltage and being connectable over a switch to one or more vehicle external power sources, including vehicle external electric stations, for thereby enabling a charging of said set of batteries belonging to the vehicle, but primarily driving the vehicle along the roadway and the roadway sections; and
 one or more driveable or powerable vehicles which may be driven by means of an electric motor or motors, with each of the respective vehicles comprising a control circuit adapted for necessary distribution of power, and for creating a required power and/or speed control, wherein an underneath side of said vehicle is provided with contact means displaceable up and down and sideways, in relation to the direction of transportation of the vehicle;
 wherein said elongated track or tracks and the conductors extend along the roadway and the roadway sections wherein said contact means is coordinated with vehicle-related control equipment for creating an adaptation of the contact means so as to at least offer a mechanical and electrical contact with said conductors;

wherein coordination between the conductors put under voltage belonging to the roadway section and the contact means of the vehicle occurs via coordinated current collectors adapted for mechanical and electrical cooperation with respective ones of the conductors put under voltage;

wherein the vehicle-related contact means comprises at least one elongated arm having a first end portion rotatably attached to the underneath side of the vehicle at a laterally fixed position relative to the vehicle such that the elongated arm may be rotated with respect to the vehicle about a vertical axis of rotation, and a second end portion supporting said contact means;

wherein one or more sensors are arranged on the lower portion of the vehicle to sense the existence of and the orientation of the track belonging to the road section and to transfer sensed information to the control equipment;

wherein the control equipment comprises a control circuit which, in response to a sensed existence of and sensed orientation within a defined area of coverage, is adapted to actuate a means adapted to horizontally move and/or lowering or elevating the contact means;

wherein said contact means has an elongated extension and is rotatably attached to the second end portion of said elongated arm about a vertical axis of rotation;

wherein the contact means is adapted to be maintained in parallel to a vertical plane passing through the vehicle and parallel to the direction of transportation of the vehicle, regardless of the angle between the elongated arm and the vertical plane passing through the vehicle.

2. The vehicle related arrangement in accordance with claim 1, wherein the first end portion of the elongated arm is oriented in front of the second end portion in relation to the momentary direction of motion of the vehicle.

3. The vehicle related arrangement in accordance with claim 1, wherein the first end portion of the elongated arm is oriented behind the second end portion in relation to the momentary direction of motion of the vehicle.

4. The vehicle related arrangement in accordance with claim 1, wherein the contact means is adapted to support at least two contact members oriented parallel to each other or behind each other.

5. The vehicle related arrangement in accordance with claim 1, wherein conductor lines which may be placed under voltage and current, are adapted to extend along said elongated arm in a direction towards one of the first or second end portions and over to the vehicle and to a circuit distributing to one or more sources of power.

6. The vehicle related arrangement in accordance with claim 1, wherein sensor units arranged on the vehicle are connected to the control equipment and are intended to indicate a maximum limit value of the displacement of the contact means.

7. The vehicle related arrangement in accordance with claim 1, wherein at an indicated maximized limit value of said contact means, when the contact means moves in a direction from an intermediate position, a means is activated for being able to elevate the contact means in cooperation with a groove and the conductors.

8. The vehicle related arrangement in accordance with claim 1, wherein at an indicated maximized limit value of said contact means, when the latter moves in a direction from an intermediate position and towards an end position, a means is activated over the control equipment for being able to raising the contact means out of cooperation with the track or groove and the conductors.

9. The vehicle related arm arrangement according to claim 1, wherein said arm is adapted to be shaped as two parallel arm portions for orienting said contact means parallel to sensed tracks or grooves allotted to the roadway section.

* * * * *